United States Patent [19]

Lamalle et al.

[11] Patent Number: 4,698,011
[45] Date of Patent: Oct. 6, 1987

[54] MANUFACTURE OF A HOLLOW ENVELOPE BY WINDING FILAMENTARY MATERIAL

[75] Inventors: Jean Lamalle, Blanquefort; Jean-Louis Tijne, Martignas sur Jalle, both of France

[73] Assignee: Aerospatiale Societe Nationale Industrielle, Paris, France

[21] Appl. No.: 756,106

[22] Filed: Jul. 18, 1985

[30] Foreign Application Priority Data

Jul. 23, 1985 [FR] France ................. 8411641

[51] Int. Cl.⁴ ................. B30B 5/02
[52] U.S. Cl. ................. 425/389; 249/65; 249/178; 249/184; 425/DIG. 5; 425/DIG. 14; 425/DIG. 112; 425/417
[58] Field of Search ............... 264/137, 314, 571, 573, 264/103, 127, 269, 334, 512, 516; 425/403, DIG. 5, DIG. 14, 417, 813, DIG. 27, DIG. 112, 389; 249/65, 178, 184; 156/173, 189, 245, 149, 161, 446, 433, 494

[56] References Cited

U.S. PATENT DOCUMENTS

| 1,504,547 | 8/1924 | Egerton | 264/314 X |
|---|---|---|---|
| 3,629,030 | 12/1971 | Ash | 264/314 X |
| 4,126,659 | 11/1978 | Blad | 264/573 |
| 4,169,749 | 10/1979 | Clark | 156/156 |
| 4,197,075 | 4/1980 | Suzuki | 425/DIG. 5 X |

FOREIGN PATENT DOCUMENTS

| 2321997 | 3/1977 | France . | |
| 759326 | 8/1980 | U.S.S.R. | 425/417 |

Primary Examiner—Jeffery Thurlow
Assistant Examiner—Leo B. Tentoni
Attorney, Agent, or Firm—Armstrong, Nikaido, Marmelstein & Kubovcik

[57] ABSTRACT

The invention is concerned with the manufacture, by winding of filamentary material, of a hollow envelope of elongate shape the profile of which evolves along its longitudinal direction. An apparatus for this purpose comprises a deformable mandrel over which the filamentary material is wound, a mould in which the mandrel carrying the winding is enclosed, and a device for flattening the envelope so produced against the walls of a cavity in a mould. The cavity wall is in the shape of the external surface of the requried envelope. The deformable mandrel comprises a rigid core and a flexible wall which is movable with respect to the core to press the winding against the wall of the mould cavity. A device may be provided for ensuring the relaxation of the tension of the threads of the winding produced when the flexible wall is in its position pressing the envelope against the wall of the cavity.

4 Claims, 15 Drawing Figures

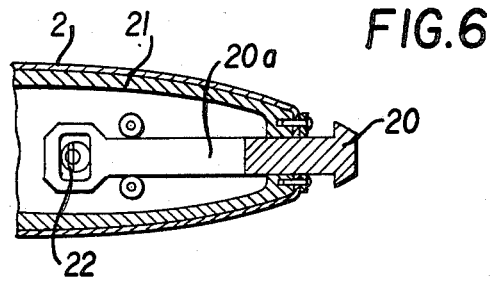
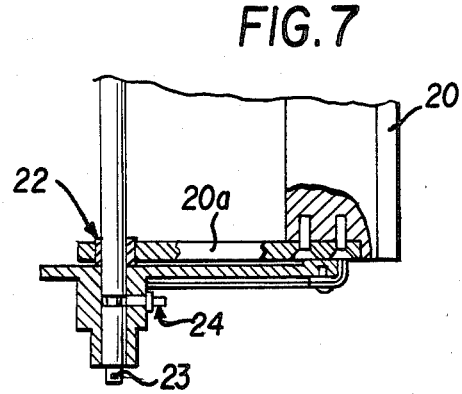
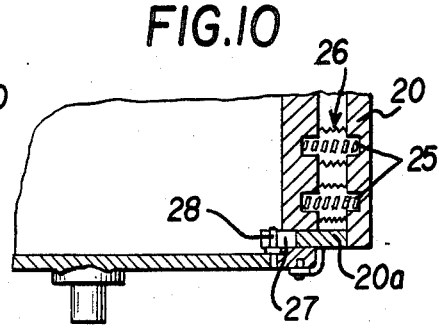
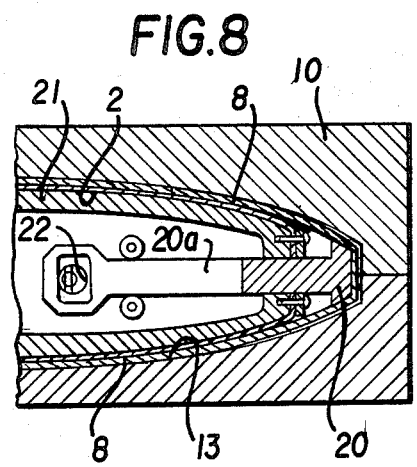
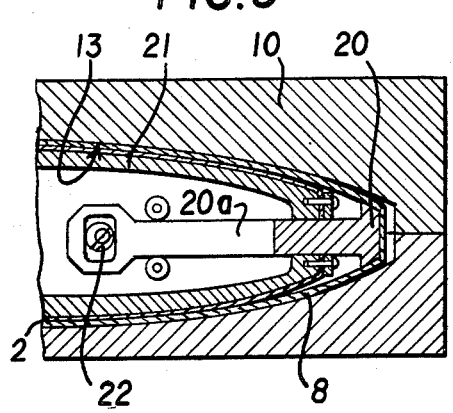

MANUFACTURE OF A HOLLOW ENVELOPE BY WINDING FILAMENTARY MATERIAL

FIELD OF THE INVENTION

The present invention is concerned with the manufacture, by winding filamentary material, of a hollow envelope the profile of which evolves along its longitudinal axis as is the case, for example, of an aeroplane or glider wing or a helicopter blade. It is equally concerned with the product obtained by putting this device to work, one important such product being an aircraft wing having an outer surface which is almost glossy.

BACKGROUND OF THE INVENTION

The idea is known of producing such hollow envelopes from composite material on a basis of fibres impregnated with polymerizable resin. These envelopes which form in particular the skin of glider wings are produced in accordance with a first technique from glass-fibre or other cloth impregnated with resin and after cutting out, draped in hollow moulds, enabling, after polymerization, usually under vacuum, half-envelopes to be obtained. The latter are then assembled by gluing after the parts of the frame of the structure have been put in place between the two half-shells and having been attached to them, for example, by gluing. The main disadvantages of this technique lie in the necessity of a workforce which is large and very well qualified because numerous operations are effected manually. In spite of the high qualifications of the workers, it is found that defects persist of which account must be taken in the design of the part by providing large margins of safety. Finally it is necessary to take the completed part up again in order to carry out finishing operations by hand, e.g. the removal of burrs from the plane of the joint and polishing, these operations leading to an extremely high cost of manufacture the main component of which is the cost of labour but which equally includes a not insignificant factor in the spilling and waste of the raw material employed.

A second method of achieving this type of product has already been proposed, which consists essentially in producing a winding filament (with threads, sheets or tapes) impregnated with resin over a substantially cylindrical mandrel and then to cut out the blank so obtained along two generatrices of the mandrel in order to obtain sheets which are then arranged in hollow moulds where, flattened against the walls of this mould, they undergo polymerization of their resin. This method enables the labour necessary to the draping of the preceding technique to be avoided, and a certain saving of material, but avoids neither the operations of assembly of the two half-shells obtained nor the finishing operations.

The idea of proceeding by winding filaments over a deformable hollow mandrel has also been proposed. The mandrel is in fact an inflatable envelope over which the winding is effected in the inflated state and then this envelope is deflated whilst still equipped with the unpolymerized winding in order to introduce it into a hollow mould the impression of which corresponds with the shape which is to be obtained. The mandrel is then reinflated in order to flatten the wound skin against the walls of the mould. The winding is then polymerized into shape. This method enables production to be mechanised and hence the cost of it to be reduced but presents an important technical disadvantage in the fact that a sliding of the fibres over one another occurs between the position in which they are wound over the mandrel and the position in which they are put into shape in the mould and fixed by the polymerization of the resin. Whereas the position of winding is known and controlled, as well as the tension of the threads, the final position of the latter as well as their state of strain is not absolutely controlled, which may affect adversely the quality and the anticipated mechanical characteristics of the product.

SUMMARY OF THE INVENTION

The invention intends to overcome these disadvantages by proposing a device by which the cost of manufacture is reduced whilst preserving in the product the mechanical characteristics which have been conferred on it by the winding law. In short, thanks to this device any uncontrolled movement of the fibres from winding until polymerization is avoided. Thus one arrives at guaranteeing an optimum utilization of the properties of the fibres which are kept, for example, at constant tension, and at obtaining a surface state of the outer skin of the envelope which is very satisfactory and does not necessitate any retouching or any subsequent polishing, whilst allowing a highly mechanised process of manufacture of it.

The invention concerns broadly, in one of its aspects, a device for manufacture of winding filaments, of a hollow envelope of elongate shape the profile of which evolves along its longitudinal direction and which includes a glossy outer surface, consisting of a deformable mandrel over which the winding is effected by means of a device for feeding at least one thread, and of a mould in which the mandrel provided with the winding is enclosed, and of means of flattening the envelope so produced against the inner walls of the cavity in the mould.

In accordance with one of the main characteristics of the invention the aforesaid deformable mandrel consists of a rigid profiled core the outer surface of which, when it is arranged in the mould, is separated from the inner surface of the mould by a substantially constant distance slightly greater than the thickness of the envelope which is to be obtained, whilst the means of flattening the said envelope comprises a flexible wall of a thickness at most equal to the difference between the thickness of the envelope and the aforesaid value, and movable with respect to the said core between a first position in which it is flattened against the outer surface of the mandrel and a second position in which it is separated from the said outer surface.

In a preferred embodiment of the invention the aforesaid movable wall comprises a flexible bladder enveloping in a fluid-tight manner at least the major portion of the said core, the gap so defined between the outer surface of the core and the bladder being selectively connected to a source of vacuum and a source of supply of a fluid under pressure.

A means of relaxing the tension of the winding as the flexible wall moves into its first position consists disposing the thread on the mandrel along a trajectory having controlled slip. In this respect it will be recalled that a trajectory having controlled slip is a form of winding, known in itself, the law of which enables a thread to be wound over a mandrel by means of the feed device for this thread, so that the length of the thread supplied is greater than the length of thread strictly necessary for joining two given points in its trajectory over the mandrel.

Another means of relaxation which may be put into effect in the invention consists of the threads themselves possessing, especially when they are of carbon, the property of becoming slack after winding and before the end of the polymerization of the resin, which property has in the prior art generally been considered a defect but which the invention exploits with advantage.

A third means may be provided by a longitudinal portion of the core which is not covered by the bladder and which is capable of being moved away from or towards the other portion of the core along guides perpendicular to its longitudinal axis. This arrangement allows relaxtion, for example, of a winding having a geodesic trajectory, that is to say, a winding the law of which is such that the device for feeding the thread, the sheet or the roving of fibres delivers the length of thread which is strictly equal to the shortest distance separating two given points on this trajectory over the mandrel, or of fibres which do not possess the aforesaid properties of elongation.

Of course these means may be combined with one another in order to obtain the best result, that is to say, the best possibilities of transfer of the envelope wound over the mandrel against the inner walls of the mould, taking into account the nature of the fibres employed, the type of winding effected and the geometrical and dimensional characteristics of the device employed. The best possibilities of transfer must be understood to be these enabling such characteristics of the envelope to be best preserved, as result from the winding used, of which the law has been determined as a function of the characteristics which are to be obtained.

A particularly useful but not exclusive application of the invention is in the manufacture of the profiled wall of an aircraft wing the ends of which are intended to be sectioned and to be provided internally with a stiffening frame secured, especially by gluing, to the inner face of the said envelope.

It may be advantageous to section the trailing edge of the wing so as to enable separation of the two edges of the envelope, so defined, in order to make easier the putting into place of the aforesaid frame. The trailing edge may then be reclosed by means of an added stringer which may be produced from composite material by wrapping or winding of filaments. The aforesaid frame will advantageously be likewise produced from composite material.

The invention will be better understood during the course of the description given below as an example purely by way of indication and non-restrictively which will enable the advantages and the secondary characteristics to be brought out.

Reference will be made to the attached drawings in which:

DESCRIPTION OF THE DRAWINGS

FIGS. 6 and 7 illustrate a varient upon the construction of the mandrel;

FIGS. 8 and 9 illustrate the operation of the varient execution as FIGS. 6 and 7;

FIG. 10 is the diagram of a varient of FIGS. 6 and 7;

DESCRIPTION OF THE PREFERRED EMBODIMENTS

Figure 1:
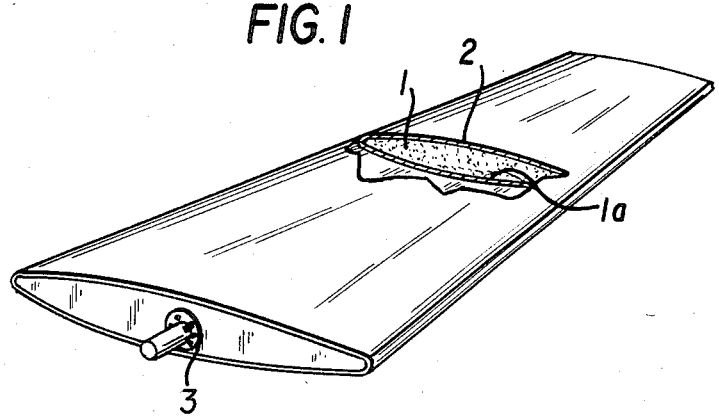
FIG. 1 is a diagram of a mandrel belonging to the device of the invention.

Referring first of all to FIG. 1 a mandrel in accordance with the invention may be seen, consisting of a rigid core 1 of any suitable matter (metallic or of synthetic material) the outer surface 1a of which has a profile of the envelope which is to be formed. This outer surface 1a is covered over with a wall 2 which is movable with respect to the core 1 between a first position in which it is flattened against the surface 1a and a second position in which it is moved away from this surface. This wall consists in fact of a flexible bladder which totally envelopes the surface 1a and is attached to the core 1 in a fluid-tight manner by its ends. A ferrule is represented at 3 for connection of the mandrel selectively to a source of fluid under pressure or to a source of vacuum which are not shown. Channels internal to the core 1 but not shown, connect the ferrule 3 to the space separating the bladder 2 from the outer wall 1a. Thus when the ferrule 3 is connected to the source of vacuum, the bladder is flattened intimately against the surface 1a of the core, whilst when the ferrule 3 is connected to the source of fluid under pressure the bladder releases itself from the surface 1a and is held away from the latter in order to ensure the operation which will be described in relation to FIGS. 3, 4 and 5.

Figure 2:
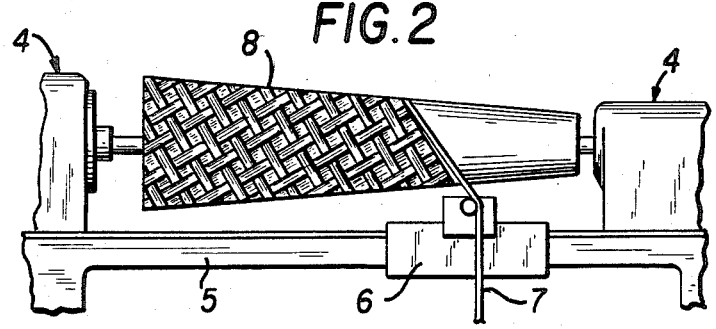
FIG. 2 illustrates diagrammatically a winding of filaments effected over a mandrel of the type of that as FIG. 1.

In FIG. 2 it may be seen that the mandrel 1, 2 is mounted in known manner upon a device for winding fibres. This device is represented in diagrammatic form and comprises a member 4 for driving the mandrel in rotation about its longitudinal axis on a frame 5 upon which is a device 6 for feeding a resin-impregnated thread, roving or cloth 7 with an alternating motion of translation which, matched to the rotation of the mandrel, puts into effect the winding law designed to impart the required mechanical characteristics. The coating 8 of the mandrel thus effected forms a skin which in its final shape and after polymerization of the resin will form the envelope desired.

The winding is effected over the mandrel with its ferrule 3 connected to the source of vacuum, the bladder 2 being then flattened against the surface 1a of the rigid core. It may likewise be pointed out that the winding effected over the mandrel may be of the type known as having controlled slip, or of geodesic type. As indicated above, the controlled slip enables the winding of a relatively slack thread, thus allowing for a certain inflation of the mandrel appearing as a placing of the fibres under tension. Winding with a geodesic trajectory implies the putting of the fibres into place under a certain tension which no longer allows inflation of the mandrel unless the fibres themselves have a capacity of elongation which appears as a relaxation of the tension after winding, due especially to the action of the resin before polymerization.

Figure 2A:
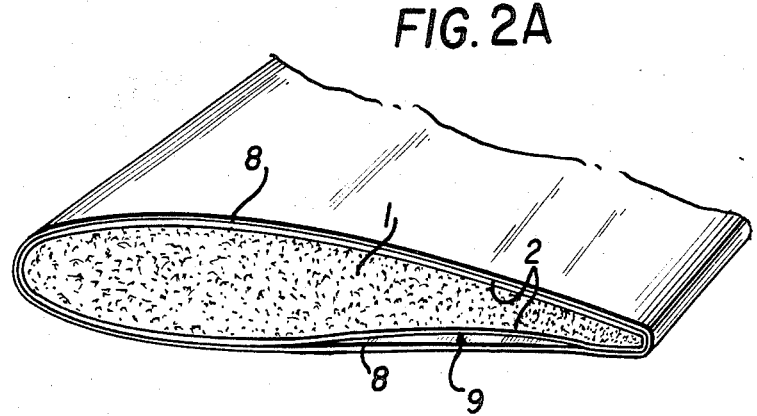
FIG. 2A is a diagram of a mandrel exhibiting a concave surface over which a winding of filaments has been effected.

FIG. 2A illustrates a mandrel which includes at 9 a concave zone. It will be observed that at this place the skin 8 is situated along the chord across this concave zone, the bladder 2 being flattened against the core 1. The concavity of the skin will be obtained at the time of the co-operation of the mandrel with the mould as explained below.

Figure 3:
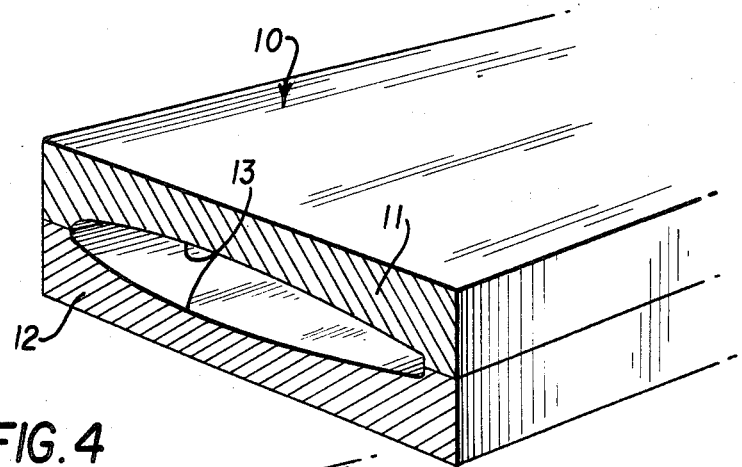
FIG. 3 is a diagrammatic view of the mould which co-operates in the device of the invention with the aforesaid mandrel.
Figure 4:
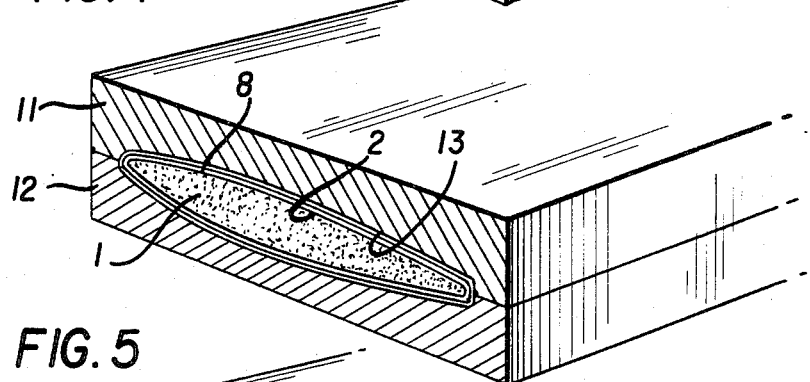
FIGS. 4 and 5 show the putting of the mandrel in place in the mould (FIG. 4) and the transfer of the envelope from the mandrel to the mould.

FIG. 3 shows diagrammatically a mould 10 in two portions 11 and 12 which define a cavity the wall 13 of which has a profile identical with that of the outer surface of the envelope which is obtained. FIG. 4 shows the wound mandrel in the mould 10 at the moment of putting it in place. It may be seen that the skin 8 which it carries over the bladder 2 still flattened against the core 1 is at a slight distance from the aforesaid wall 13. The thickness of the gap separating them will be as small as possible. In other words, and this is an important characteristic of the invention, care will have been taken to determine the profile of the core 1 and that of the surface 13 of the mould cavity 10 so that the outer surface of the bladder 2 when it is flattened against the core 1 and the mandrel is seated in the mould, is at a distance from the surface 13 which is slightly greater than the thickness of the skin, this being at all points. The value of the excess of this distance with respect to the thickness depends upon a number of factors resulting from the nature of the fibres and from the nature of the winding which condition the limit within which the bladder 2 may be inflated in order to bring the skin 8 into contact with the wall 13 as illustrated in FIG. 5, whilst preserving or restoring to the fibres a substantially uniform tension in this configuration.

Figure 5:
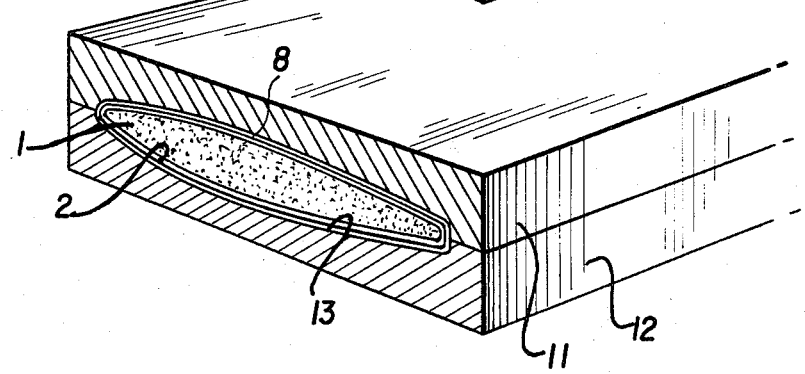

After having been flattened against the wall 13 by inflation of the bladder 2 as shown in FIG. 5, the skin 8 is polymerized. The operation of transfer of the skin from the mandrel to the mould enables the tension characteristics to be conferred upon the fibres, which they must have at the time of polymerization, without causing displacements between them, their winding orientation being accurately preserved. In addition it enables a state of the outer surface to be obtained which is very smooth, nearly glossy, avoiding the need for any operation of retouching and polishing.

For the obtaining of an envelope having a portion having a concave surface, the mould 13 will have a convex portion facing the concave zone on the mandrel. Upon putting the mandrel in place in the mould, the convex portion comes into contact with the zone of the skin situated along the chord across the concave portion (see FIG. 2A) and constrains it to approach the concave surface of the mandrel. The inflation of the bladder will carry out the transfer of the remainder of the skin from the mandrel towards the mould.

The description given above with respect to FIGS. 1 to 5 is illustrative and starts out from the assumption that the capacities for elongation of the fibres are sufficient for the transfer to be able to be effected. It may be, however, that they do not totally allow of it and FIGS. 6 to 10 illustrate an arrangement of the mandrel which enables a transfer to be effected with fibres which do not stretch or do not stretch sufficiently because of their nature or of the nature of the winding. In FIGS. 6 and 7 there is also represented the core 1 of the mandrel, equipped with a longitudinally-extending head portion 20 having a stem portion 20a slibably mounted, a hollow main portion 21 so that the head portion 20 can be moved away from or towards the main portion 21. A cam system 22 is coupled to an element 20a for control of the position of the portion 20 and its rotation is controlled by means of a squared end 23 on the shaft. This control element 20a likewise forms a guide perpendicular to the longitudinal direction of the mandrel, for the displacement of the movable portion 20. A brake 24 locks the control of the cam in order to fix the aforesaid portion 20 in a certain position. It will be observed that the bladder 2 does not cover the moving portion but is coupled in a fluid-tight manner to the longitudinal end of the portion 21 situated facing the portion 20a.

FIGS. 8 and 9 show the mandrel as in FIGS. 6 and 7 carrying a winding of filaments and seated in a mould 10. FIG. 8 corresponds with the diagrammatic representation as FIG. 4, that is to say, before inflation of the bladder 2. It will be observed that the skin 8 has been wound over the mandrel 20, 21 with the portion 20 held in a position away from the portion 21. FIG. 9 corresponds with the arrangement as FIG. 5 in which the bladder 2 has been inflated. At the same time by means of the cam 22 the head portion 20 has been moved towards the main portion 21. The increase in peripheral length of the skin has thus been compensated for by the retraction of the portion 20. This arrangement, combined with the value of the pressure of inflation of the bladder enables the tension of the fibres in the skin to be adjusted at the time of polymerization.

FIG. 10 shows a variant of the mandrel of FIGS. 6 and 7 in which the head portion 20 is retracted automatically at the time of inflation of the bladder against the effect of resilient members (here constituted by springs 25 located in protective bellows 26) which tend to return the head portion 20 into its position of maximum extension. The motion of this portion 20 is guided by the stem portions 20a which include a closed-ended slot 27 co-operating with a fixed stop 28.

Figure 11:
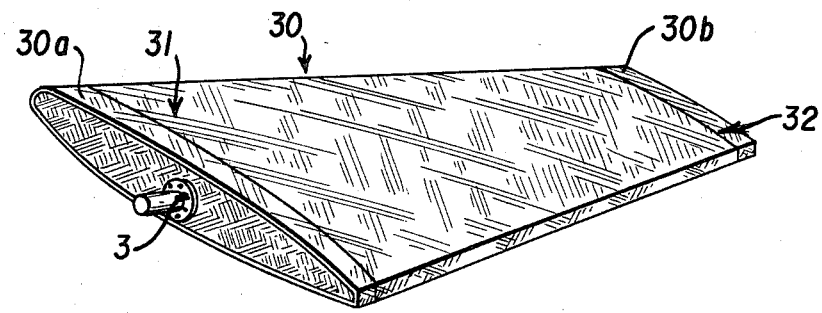
FIG. 11 shows an envelope obtained by the device of the invention.

FIG. 11 shows the envelope obtained after its removal from the mould. This envelope 30 is still on the mandrel. In order to withdraw the mandrel the two ends 30a and 30b of the envelope are sectioned along lines of section 31 and 32 after having deflated the bladder 2.

Figure 12:
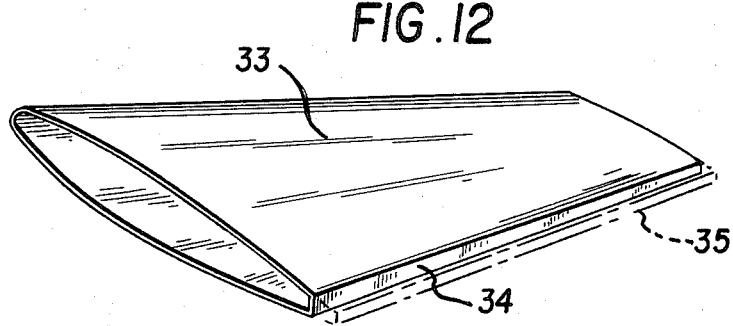
FIG. 12 illustrates the structure of the wall of a wing from the envelope as FIG. 11.
Figure 13:
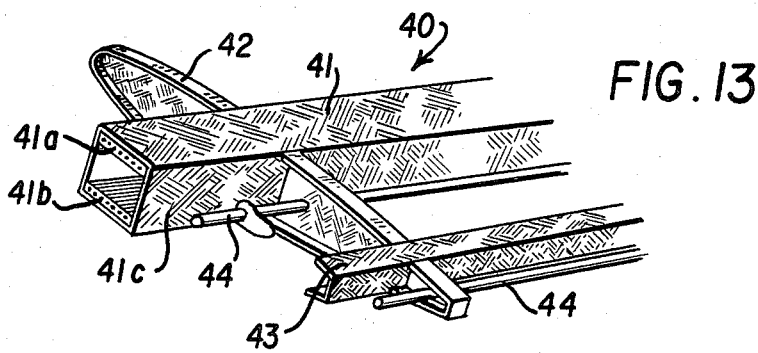
FIG. 13 is a diagram of the frame for reinforcement of the wall as FIG. 12.

In the case especially of an envelope obtained on a mandrel in accordance with that represented in FIGS. 6 and 7, it may be advantageous to section the portion of the envelope which was situated beyond the longitudinal edge of the portion 21 of mandrel onto which the bladder is fixed. FIG. 12 shows that thus an envelope 33 is obtained which is open longitudinally at 34 by cutting off the portion 35. This envelope in a similar way to that obtained by simple transverse sectioning, finds an interesting application as the outer wall of an aircraft (glider) wing. In fact their qualities of strength and of surface state are quite compatible with the standards required for a wing. They may then easily receive a reinforcing structure such as that 40 represented in FIG. 13. This structure includes a main beam 41 which may advantageously consist of two sole elements 41a, 41b of unidirectional composite material connected by a winding 41c, the whole forming a hollow beam having straight sides, and of evolving cross-section. It likewise includes ribs 42 which may be of wrapped composite, for example, and a stringer 43 in the form of a composite structure similar to that of the main beam 41 or formed by a technique by wrapping. The reinforcing structure likewise includes control rods 44 for the flaps and airbrakes of the wing.

Figure 14:
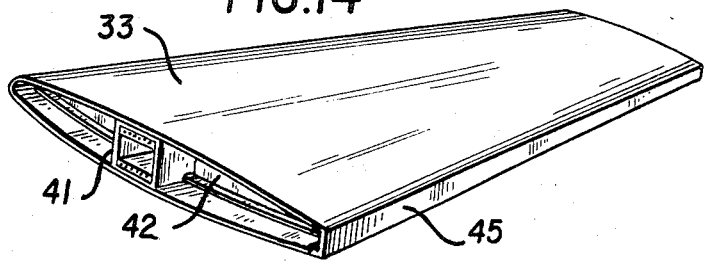
FIG. 14 illustrates the complete wing provided with its frame.

The prefabricated reinforcing structure is coated with a film of glue on the faces of the ribs, main beam and stringer which face the concave surface of the envelope, and is then introduced into the envelope through one end of it. Use may be made of the mould 10, provided on its face 13 with flexible cushions as a pressure member at the time of gluing. It should be observed that the envelope 33 in FIG. 12 enables the two edges of its rear opening to be separated elastically and thus to favour the introduction of the reinforcing structure whilst preserving the film of glue which it possesses. The portion 35 which was cut off may then serve as a stringer 45 (FIG. 14) for closure of the trailing edge. The finishing of the wing will include the putting in place of prefabricated elements such as the flaps, the airbrakes, . . .

The methods and apparatus described above have important applications in the filed of aeronautics and more generally in any industry (the automobile or pleasure industries, or the manufacture of blades such as windmill blades) for the manufacture of hollow envelopes which are not bodies of revolution.

We claim:

1. Apparatus for the manufacture of an elongate hollow envelope of a wound material comprising: a hollow mound having a cavity wall in a shape of an external form of the envelope and an elongate deformable mandrel which includes a rigid core, a headed portion extending longitudinally along the entire mandrel, said headed portion being movable towards or away from said cavity wall of said hollow mold and a flexible wall enclosing at least part of said rigid core, and control means for selectively causing said flexible wall to be contracted into contact with the rigid core and expanded relative to the rigid core, said mandrel being capable, with the flexible wall thereon in its contracted state, of insertion into the hollow mold cavity leaving a clearence between material wound on the mandrel and the cavity wall over the entire periphery of the mandrel.

2. Apparatus as claimed in claim 1, wherein said flexible wall comprises a resilient bladder enveloping in a fluid-tight manner at least the major portion of said core, and wherein said control means comprises a vacuum source and a source of fluid under pressure selectively connectible to the interior of the bladder.

3. Apparatus claimed in claim 1, comprising cam means connected to move said headed portion selectively towards and away from the core.

4. Apparatus as claimed in claim 1, comprising spring means connected between the headed portion and the core and arranged to urge the headed portion resiliently into an end position away from the core.

* * * * *

UNITED STATES PATENT AND TRADEMARK OFFICE
CERTIFICATE OF CORRECTION

PATENT NO. : 4,698,011
DATED : October 6, 1987
INVENTOR(S) : Jean LAMALLE et al

It is certified that error appears in the above-identified patent and that said Letters Patent is hereby corrected as shown below:

On the cover page, Item [30], "July 23, 1985" should read --July 23, 1984--.

Signed and Sealed this

Twenty-fourth Day of May, 1988

*Attest:*

DONALD J. QUIGG

*Attesting Officer*  *Commissioner of Patents and Trademarks*